(12) United States Patent
Edwards

(10) Patent No.: US 7,673,797 B2
(45) Date of Patent: Mar. 9, 2010

(54) PERSONALIZATION OF SELF-CHECKOUT SECURITY

(75) Inventor: Thomas V. Edwards, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 98 days.

(21) Appl. No.: 11/638,025

(22) Filed: Dec. 13, 2006

(65) Prior Publication Data
US 2008/0147511 A1    Jun. 19, 2008

(51) Int. Cl.
*G06K 15/00* (2006.01)

(52) U.S. Cl. .................. 235/383; 235/380

(58) Field of Classification Search .............. None
See application file for complete search history.

(56) References Cited

U.S. PATENT DOCUMENTS

| | | | |
|---|---|---|---|
| 4,676,343 A | | 6/1987 | Humble et al. |
| 5,819,226 A | * | 10/1998 | Gopinathan et al. ......... 705/44 |
| 5,877,485 A | * | 3/1999 | Swartz ..................... 235/383 |
| 5,992,570 A | | 11/1999 | Walter et al. |
| 6,047,262 A | * | 4/2000 | Lutz ......................... 705/16 |
| 6,092,725 A | | 7/2000 | Swartz et al. |
| 6,189,790 B1 | | 2/2001 | Watlter |
| 6,659,344 B2 | | 12/2003 | Otto et al. |
| 6,672,506 B2 | * | 1/2004 | Swartz et al. ............. 235/385 |
| 2003/0024982 A1 | * | 2/2003 | Bellis et al. .............. 235/383 |
| 2003/0177066 A1 | | 9/2003 | Zhang et al. |
| 2003/0217892 A1 | * | 11/2003 | Persky .................... 186/68 |
| 2005/0187825 A1 | * | 8/2005 | Kirkley ................... 705/18 |
| 2007/0174074 A1 | * | 7/2007 | Ramsey et al. ............. 705/1 |

* cited by examiner

*Primary Examiner*—Thien M. Le
*Assistant Examiner*—Christle I Marshall
(74) *Attorney, Agent, or Firm*—Maginot, Moore & Beck LLP; Harden E. Stevens, III

(57) ABSTRACT

A method is provided for personalizing security conditions for each customer using a self-service checkout terminal to conduct a transaction on the terminal. A trust level is assigned to each customer based on a selection of factors, which may include personal information provided by the customer, factors independent of the customer, such as information specific to the particular merchant, and the customer's history in using the checkout terminal or other facilities of the merchant. The manner in which the transaction progresses for the customer is determined as a function of the customer's trust level. In one example, the weight tolerance applied to products weighed by the customer may be widened or narrowed in relation to the customer's trust level.

14 Claims, 2 Drawing Sheets

PERSONALIZATION OF SELF-CHECKOUT SECURITY

BACKGROUND

The present invention relates generally to a retail checkout terminal, and especially to self-service terminals. More particularly, the invention concerns systems and methods for improving the security of self-service checkout processes and to personalize the security features based on customer metrics.

In the retail grocery or supermarket industry, the impetus to reduce labor costs has focused on reducing or eliminating the amount of time required to handle and/or process the products purchased by the customer. To this end, a number of self-service checkout terminals have been developed which substantially eliminate the need for a checkout clerk. In particular, the typical self-service checkout terminal is operated by the customer without the aid of a checkout clerk. In such a system, the customer scans individual items for purchase across a scanner and then places the scanned items into a grocery bag. The customer then pays for the purchases either at the self-service terminal itself or at a central payment area staffed by a store cashier.

The customer typically has little or no training in the operation of a self-service checkout terminal prior to his/her initial use of the terminal. Customer inexperience and sometimes more nefarious intentions in the use of the self-service checkout require the integration of some form of security into the checkout terminal. Such security prevents a customer from either inadvertently or deliberately placing an item into a grocery bag without first scanning the item to enter the price of the item onto the final bill.

Thus, the typical self-service terminal includes security systems that monitor the operation of the terminal and the activities of the customer. For example, weight scales are incorporated into the terminal to monitor the total weight of the items brought by the customer to the terminal and the total weight of the items placed in a grocery bag. In such security systems, a software routine is executed by a computer or processor associated with the terminal that analyzes the signal output from the weight scale, as well as other user-interfaces of the terminal. The typical software routine compares the weight of each item as it is scanned with a database of expected weight values. Any discrepancy results in the generation of an error message and a pause in the checkout routine until the customer takes appropriate corrective action, such as re-scanning the merchandise.

One known self-checkout terminal 10 used in a supermarket setting is depicted in FIG. 1. The terminal 10 includes a product weight scale 12 and a scanner 14 associated with the scale. A bagging scale 20 is provided adjacent the scanner to support grocery bags 40 into which the customer places each newly scanned item. The terminal 10 includes a cart scale sized to support a fully loaded shopping cart 21 and a basket scale 19 configured to support a shopping basket 23 full of products. Each of the scales 12, 18, 19 and 20 include at least one weight detector, such as a pressure sensor or a load cell sensor, which is operable to generate a signal in response to the weight of the item(s) placed on the scale. A kiosk 24 includes a display 32, data input device 34 and a payment device 30. A computer or processor 26 is resident within the terminal and executes various software routines associated with the self-checkout process.

One of those routines accepts weight signals from the scales 12, 18, 19 and 20. In one type of weight verification routine, the mean weight $M_n$ of each product or item 1 through n available in the supermarket is stored in a database along with a weight standard deviation $SD_n$ for each item. As an item is scanned by the scanner 14, the weight measured at the bagging scale 18, 19 or 20 is compared to a weight range calculated from the mean and standard deviation data extracted for that item from the database. If the weight falls within that calculated range, the entry is accepted. If the weight falls outside the mean weight $M_n \pm$ the standard deviation $SD_n$, the entry is rejected and the customer is instructed to re-scan and/or re-weigh the item. In addition, in some terminals, a weight error is communicated to a store attendant as part of the terminal security measures. The routine continuously updates the mean weight and standard deviation values for each item with each new accepted observation of the weight of that item.

There are a number of scenarios in the self-checkout process that can interrupt the transaction. For instance, the customer may place the wrong item in the bagging area, or the item can be placed in the bagging area without first having been scanned to log the purchase. Other errors arise when items or bags of items are removed from the bagging area at inappropriate times. The highest level of security can catch all deviations from the expected norm, as represented principally by a comparison of the cumulative product weights at the beginning and end of the transaction. However, the highest level of security requires the highest level of scrutiny of each transaction and each product being purchased, which necessarily leads to the highest rate of rejection of attempted purchases or entire transactions. This generally unforgiving level of security can significantly increase the amount of time needed to complete a transaction and can greatly increase customer frustration.

On the other hand, the lowest level of security allows all errors to pass without recourse. Of course, this approach is unacceptable. However, lower acceptable levels of security may still make theft or fraud in the transaction much easier for high risk customers. Of course, the benefit to the customer of lower security levels is that fewer erroneous product transfers or transactions are noted, which speeds the process and makes it less unpleasant.

While some customers may be reliable or trustworthy enough to merit reduced security measures, other customers may be high risk. Thus, there is a need for a system and method that can meet the security needs of the retail establishment as well as the legitimate needs and desires of all users of the system.

SUMMARY OF THE INVENTION

In order to address the security needs for merchants utilizing self-service facilities, the present invention contemplates a method for personalizing security conditions for a customer using those facilities, such as a self-service checkout terminal, to conduct a transaction on the terminal. In accordance with one feature of the invention, each customer is assigned a trust level and a trust level value for that customer is stored in a database accessible by the terminal. When a customer commences a transaction, a processor within the terminal obtains the trust level value for that customer from the database. The processor then adjusts the manner in which the transaction occurs as a function of the customer's trust level.

In one embodiment, the terminal includes a product weight scale on which the customer weighs items being purchased during the transaction, and in which the terminal evaluates the weight of each item relative to a mean weight for that item. In accordance with this embodiment, the processor adjusts the manner in which the transaction occurs by applying a weight tolerance band of acceptable weights about the mean weight as a function of the customer's trust level. This tolerance band may be established by product weight data obtained from a database of mean weights and standard deviations for items being purchased during the transaction. The weight tolerance may correspond to a 1σ band of one standard deviation about the mean, a 2σ band of two standard deviations about the mean, and a 3σ band of three standard deviations about the mean. Product weight measurements outside the weight tolerance band will generate a weighing error and prompt some form of intervention into the transaction. The 1σ band may be assigned to a customer with the worst trust level, while the 3σ band may be assigned to a customer with best trust level.

In another aspect, the terminal includes software or applications that monitor the customer's actions during the transaction and determine whether an error has occurred in the customer's use of the terminal during that transaction. In this case, the terminal processor may adjust the manner in which the transaction occurs by adjusting the number of errors by the customer that will be tolerated before the transaction is interrupted. For instance, a customer with a high trust level may be permitted more errors during the transaction before the transaction is interrupted than a customer with a low trust level. One type of error may be customer errors in weighing items being purchased. A higher trust level customer may be permitted more weighing errors since those weighing errors are believed to be well-intentioned.

The present invention further contemplates a method for personalizing security conditions in which the terminal applies security measures to the transaction to determine whether the customer's conduct during the transaction is indicative of an attempted theft or other violation of the security of the transaction. In this aspect, the security measures are selected as a function of the customer's trust level. Thus, low trust level customers may not be permitted to perform certain functions at the terminal that may otherwise facilitate a theft or other security violation.

In one aspect of the invention, the method for personalizing security conditions further comprises obtaining information about the customer's conduct during the transaction and using that information to determine an increase or decrease in the customer's trust level. If a change in trust level is indicated based on that information, the updated trust level value for the customer is stored in the database for access during future transactions. In certain embodiments, the customer's trust level may be changed during the current transaction. In other embodiments, the customer's trust level is changed after the completion of a predetermined number of transactions so that the updated trust level is indicative of a pattern of conduct for the customer.

In a further aspect, the inventive method comprises evaluating collateral factors independent to the customer that relate to the security of transactions on the terminal and then assigning a trust level to the customer based on these collateral factors. The trust level may alternatively or additionally be based on personal information obtained from the customer that relate to the security of transactions on the terminal.

It is one object of invention to provide a method for personalizing security conditions for a self-service facility that are transparent to the customer. Another object is to personalize the security conditions as a function of indicia of risk associated with the customer or the transaction.

One benefit of the present invention is that a method is provided for assigning security conditions to customers that are a function of the risk of error or theft for that customer. A further benefit is that the security conditions are minimal if the risk is minimal, and are increased as the assessed risk for a customer increases.

A further benefit of the invention is that it permits adjustment of the security conditions assigned to a particular customer based on the customer's transaction history at the facility. Other benefits and objects of the invention will become apparent from the following written description taken together with the accompanying figures.

DESCRIPTION OF THE PREFERRED EMBODIMENTS

Figure 1:
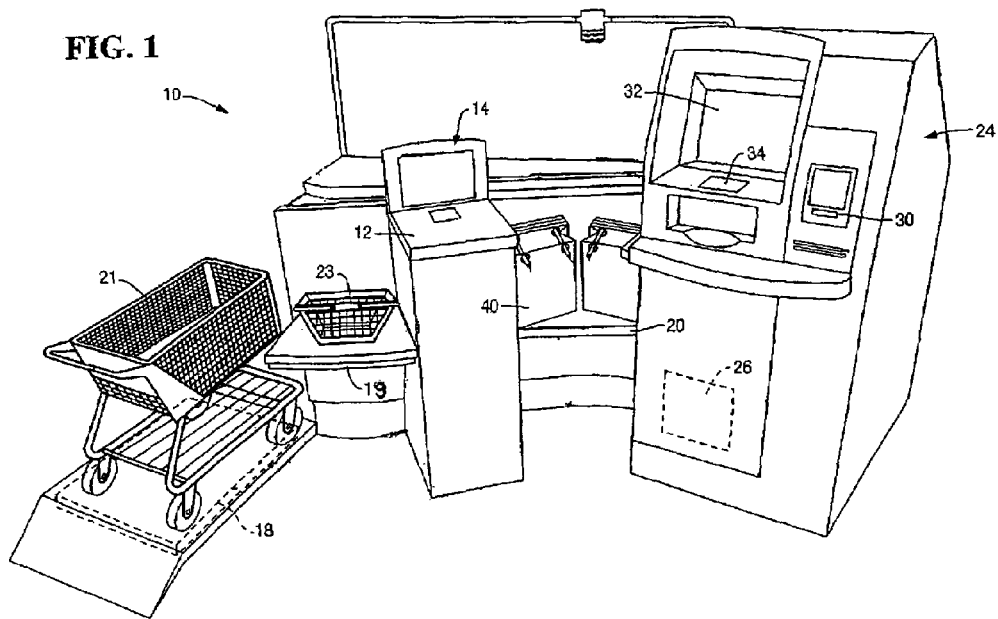
FIG. 1 is a perspective view of one type of self-service checkout terminal adaptable to incorporate the systems and methods of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
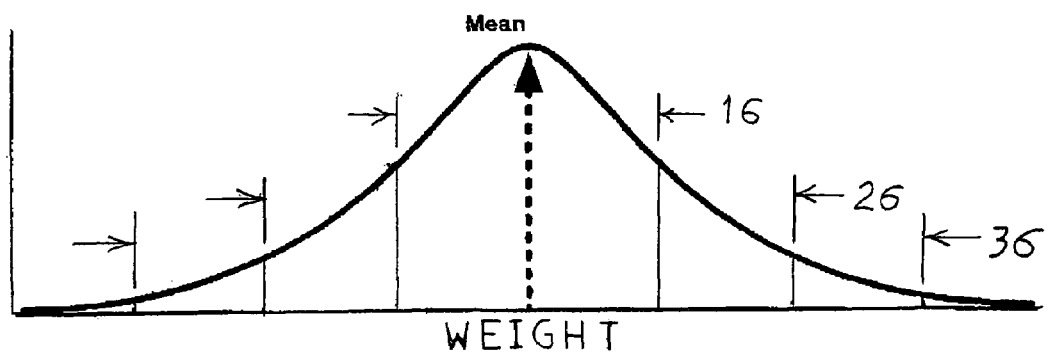
FIG. 2 is a weight distribution curve for a typical product showing acceptable measured weight bands corresponding to different levels of security

As explained above, the self-service checkout terminal 10 weighs each product after it has been passed to the bagging area 40 to determine whether the item has actually been scanned and whether the actual weight of the item is at or near the expected weight for that item. A centralized processor maintains a database of expected product mean weights and standard deviations around that mean, as depicted in FIG. 2. The stored weight data is based on a statistically significant sampling of weights for each item of that type, collected over a long period of time. Preferably, the product weight from each successful transaction is added to that statistical sampling to update the product mean weight and standard deviation.

As reflected in FIG. 2, the weight distribution for each product follows the well-known bell curve. The curve in the figures is a reflection of the fact that each new product scanned at the terminal 10 will not fall exactly at the mean weight due to variations in the product or its packaging. However, each new product should fall within a predetermined range about the mean weight. The predetermined weight ranges or bands are typically based on the standard deviation of the statistical sampling of weights used to produce the distribution curve in FIG. 2. The 1σ band corresponds to one standard deviation on either side of the mean weight. It is known that the 1σ band includes 67% of the weights used to create the distribution curve. The wider 2σ band includes 95% of the product weights, while the even wider 3σ band accounts for 99% of the product weights.

If an item scanned by the customer that falls outside a predetermined weight range it can be surmised that the item being weighed is not the item that it is supposed to be, or that either the scanning or the weighing step was improperly executed. In the latter case, the error may be corrected by re-scanning or re-weighing. In the former case, a security alert may be warranted because the customer may be acting deliberately.

In one aspect of the invention, the weight tolerance range or band applied to a given customer is a function of that customer's history. Thus, for a customer with a high degree of reliability or trustworthiness, the weight band applied to his/her transaction may be the $3\sigma$ band shown in FIG. 2. Application of this $3\sigma$ band means that the product being weighed by that customer need only fall within that broad band around the mean weight value. On the other hand, a customer with no history (i.e., a first-time self-service user) may be permitted only the narrower $1\sigma$ band, which means that any product weighed by that customer must fall closer to the mean weight than the first customer.

By way of example, assume that the average weight of a pound of butter has been learned to be 1.08 lbs. After statistical sampling, it is further learned that this weight varies about the mean weight with a standard deviation of 0.03 lbs. Thus, the $1\sigma$ band will be 0.03 lbs. on either side of the mean weight, or 1.05-1.11 lbs. The $2\sigma$ band is 1.02-1.14 lbs ($1.08\pm2\times(0.03)$) and the $3\sigma$ band is 0.99-1.17 lbs ($1.08\pm3\times(0.03)$). Thus, the more reliable or trusted shopper may scan a pound of butter that weights 1.16 lbs. without incident since that weight falls within the $3\sigma$ band. On the other hand, if the first-time customer scans a pound of butter that weighs 1.12 lbs, an error condition will arise because that weight is outside the $1\sigma$ band assigned to that customer. The nature of response to that error condition can range from sending a message to re-scan and re-weigh the item (if the weight is close to the $1\sigma$ band), to intervention by a store attendant who can verify that the scan and product weight is correct, to terminating the transaction if theft is suspected (such as if the measured weight is well outside even the $3\sigma$ band for that product).

In accordance with one embodiment of the present invention, each customer is assigned a "trust level" which determines how certain aspects of the self-service checkout transaction will occur for that customer. The term "trust" in the context of the present invention contemplates no only honesty in using the self-service features of the checkout terminal 10, but also reliability, or competence, in using the equipment. A trustworthy customer may not be competent in his/her use of the scanner or weighing equipment of the terminal. One object of assigning a "trust level" for a customer is to determine the need to scrutinize the transaction more carefully. Another object of the customer "trust level" is to personalize the process steps during the transaction. For the purposes of the present disclosure, the terms "trust", "trustworthiness", "reliable" and "reliability" may be used interchangeably as an indication of honesty and/or competence in using the equipment. It is understood that the "trust level" may be limited to one or the other of these general definitions, or may reflect considerations of both honesty and competence.

This trust level may be part of a personalization database that is preferably stored in the centralized processor and made available to a checkout terminal when the particular customer identifies himself/herself at that terminal. This database may include user preference information, such as language and display features for interacting with the kiosk 24 of the terminal 10.

More pertinent to the present invention, the personalized database includes System Data that are generated by and tailored to the particular merchant. The System Data includes the security profile for the particular customer which may be based upon a number of factors indicative of the risk potential associated with that customer. Any number of factors may be used to create a security profile for a particular customer, some of which are customer specific and others of which may be specific to the particular store and its products. The latter category of factors may include the following: history of theft at the store or in the neighborhood, store product mix, average item cost, region of the country, proximity to state and international borders, current economic conditions, and the like. The store-related factors may be selected as an indicator of the likelihood of dishonest behavior at the self-service terminal. These factors do not change with the customer, but rather are generally fixed, or at least set by the store for a long period of time.

The customer specific factors may be based on the individual customer or upon segmentation into groups of shoppers. These groups may be based on store loyalty, buying habits, dollar amount of transactions and history of transaction interventions compared to a pre-determined norm. For instance, it may be known that long-term customers of a store (i.e., five years or more) may incur the fewest number of transaction interruptions due to mis-scanning or mis-weighing, or that store-loyalty makes a customer less prone to dishonest behavior at a self-service terminal. It may also be determined that customers purchasing several items are more inclined or less inclined to generate an error during the transaction. The same conclusions may be drawn from other groupings of customers.

The goal of these more general factors is to create the foundation for an overall trust or reliability profile for a particular shopper. These customer groupings, along with the store-dependent factors mentioned above, may be used to establish a baseline trust level for a customer falling within that group. This baseline level may be sufficient for certain merchants, or may provide a starting point for determining the specific trust level for a specific customer. It is contemplated that the customer grouping factors will change infrequently, but more often than the store-dependent factors. Moreover, it is also contemplated that these customer grouping factors will be affected by each transaction of a member of that group—i.e., the trust level assigned to each customer grouping may be updated based on each transaction.

The customer specific factors may also include customer-specific information. Some of that information may be obtained directly from the customer at an initial sign-up procedure, such as might occur when obtaining a frequent shopper card or check-cashing approval at a store. This information may be used to determine whether the particular customer fits within a general customer grouping, as discussed above. Some of the information may be directly determinative of the customer's reliability. For instance, a customer with acknowledge experience in a self-service checkout may be entitled to a higher trust level than a novice. On the other hand, a customer with a history of theft or check-kiting may only be entitled to the lowest trust level.

The customer-specific factors depend upon accurate identification of the person conducting the transaction as being that customer. One level of identification may be obtained from a frequent shopper card or a credit/debit card. In order to ensure that the identifying card is not being used by someone other than the named person, other forms of identification may be employed, such as passwords or biometric data. It may be contemplated that a customer with a higher trust level may require more identifying information to ensure the identity of the customer.

All of these factors accumulate to establish a trust level for each customer at the beginning of every transaction. For an existing customer, a value corresponding to his/her trust level may be maintained in a local or a centralized database, along with the other data of that customer. For a new or infrequent customer, a default trust level may be assigned. The default level may be the lowest trust level available, or may be a trust level based on the store-specific factors described above.

One feature of the present invention is that the trust level value for a customer is not static. In other words, the trust level may increase or decrease based on the customer's transaction history. For instance, if a customer consistently operates within the limits of a security profile, that customer's trust level may be elevated. Conversely, if the shopper repeatedly exceeds the security profile limits, the trust level may be decreased. For example, if a customer consistently mis-scans or mis-weight items, a lower trust level may be assigned along with the more stringent security associated with that lower trust level. It is contemplated that the trust level may be evaluated on a transaction basis, meaning that after every transaction or every few transactions the customer's performance is evaluated and compared to his/her prior performance or to the norm performance of a shopper's group to which the customer may have been assigned. It is further contemplated that the security evaluation may be continuous during a single transaction. Thus, if a customer begins a transaction at the lowest trust level (because he/she is a new customer), that level may be increased interactively during the transaction as the customer exhibits reliability at scanning and weighing the products being purchased. Conversely, if a customer with an initially high trust level repeatedly mis-scans or mis-weighs, the trust level may be interactively decreased so that the remainder of the transaction is subject to more stringent security.

The security measures associated with the trust levels may tailored by the merchant. These measures may include bag scale measurement tolerance. As described above, this security measure assigns a weight band ($1\sigma$, $2\sigma$ or $3\sigma$) based on trust level. Other security measures related to the product weight measurements include the number of permissible weighing errors, the number of permissible weight mismatches, or the number of permissible unexpected weight increases or decreases. It is expected that even the most reliable and competent shopper may have weighing anomalies, so not every weighing discrepancy is a trust-related incident. Moreover, some anomalies are simply caused by the equipment. Thus, each trust level may have a pre-determined number of weighing anomalies that are accepted before a security alert is raised.

Other security measures may relate to bagging of the goods after scanning, such as late bagging. In most self-service checkout terminals, the customer is given a certain period of time after scanning an item in which the item must be placed in a shopping bag. "Late bagging" means that the customer did not place the item in the bag quickly enough. Again, a sporadic history of late bagging may not affect the trust level, but repeated occurrences are indicative of a problem. The number of permissible late bagging events may be tied to the trust level and may also be considered in adjusting that level for future transactions.

Other security measures relate to how the transaction is conducted. For instance, credit/debit card or personal check approval limits may be adjusted as a function of trust level. With respect to credit or debit card transactions, the limit at which a signature is required may also be a function of trust level. Certain transaction activities may be altered or adjusted based on the trust level of the customer. For instance, customers with the highest trust level may be authorized to skip the bagging step typically needed to complete the transaction. Other user interface features may be made available or unavailable based on the customer's trust level. The trust level may also be used to dictate the messages and prompts provided to the customer during the transaction. For instance, an experienced frequent shopper may not require the "walk through" instructions that guide each step for each item (i.e., "Scan the Item", "Place the Item in the Shopping Bag", etc.). On the other hand, a novice shopper may require more detailed instructions, including an introductory tutorial, as well as additional time to complete the steps of the transaction.

The security features of the terminal may be de-activated for items below a particular dollar amount, or stricter security standards may be implemented for items above a value threshold. For certain high risk, low trust level shoppers, an immediate notification may be transmitted to an attendant overseeing the self-service checkout terminals.

The security system of the present invention may be implemented as a software program within the processor 26 of each terminal and in a local and/or centralized database. A centralized database may be preferred where multiple self-service terminals are networked and where multiple store locations are involved. Each store and each checkout terminal may then communicate with the centralized database to extract the necessary store-related and customer-related security information.

Figure 3:
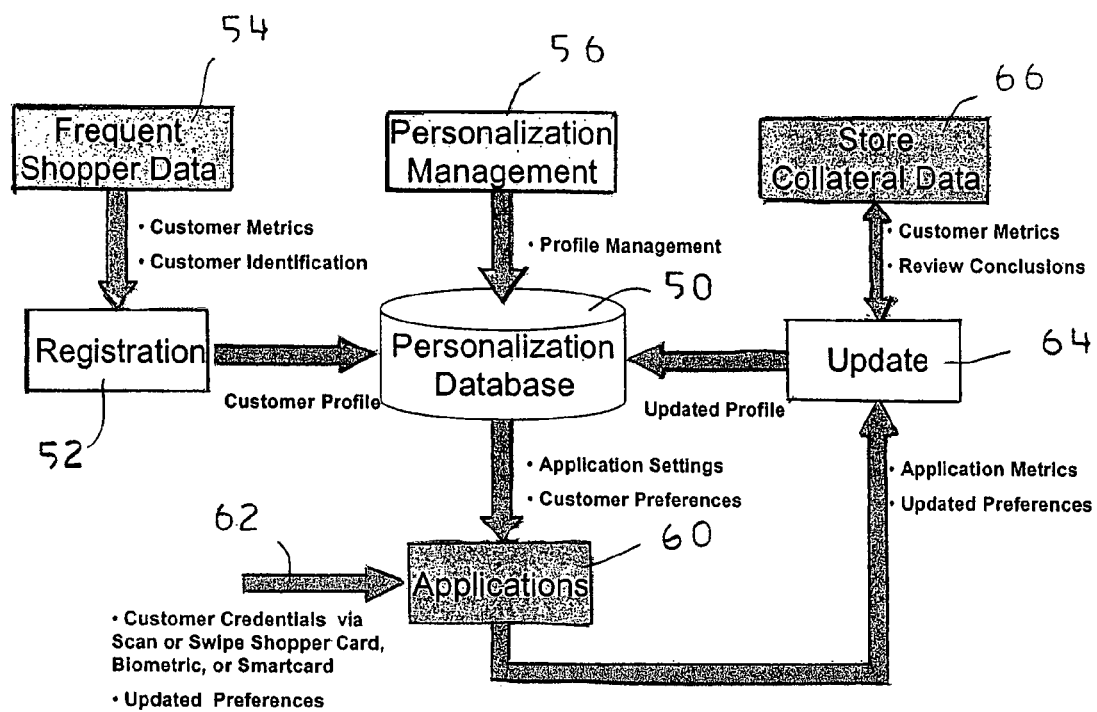
FIG. 3 is a block diagram of one architecture adapted to accomplish a method for personalizing security conditions for customers using a self-service facility.

An example of a system architecture for implementing the security systems and methods of the present invention is depicted in FIG. 3. The personalization database 50 is maintained in the centralized database discussed above. A customer may be registered into the database 50 through a registration process 52, which may include entry of requested frequent shopper data 54. This registration process 52 may include the entry into the personalization database of customer identification and metrics information to begin to create a customer profile. The information and factors considered in creating the customer profile stored in the database is administered by a personalization management function 56. This function may be administered at the local store level or at a corporate or division level.

A customer can access the particular checkout software processes or applications 60 by providing some means of identification at the self-service terminal 10. For instance, the customer may initiate the applications by scanning a frequent shopper card at the scanner 12, by entering a credit/debit card at the payment device 30, or by other means capable of identifying the particular customer to the terminal 10. Once the customer has been identified, the applications 60 access the personalized database 50 to extract any available information about the user. The applications also draw customer preference data (previously entered by the customer) as well as application settings, namely security settings corresponding to the customer. The security settings are based on the customer's trust level, which may be determined in the manner set forth above. If the customer is a first-time user or the data for that customer is stale (i.e., more than three months without a transaction), then the default trust level and the associated security settings may be applied. Alternatively, the applications 60 may direct the customer to the registration process 52 where the customer may enter data sufficient to place the customer within certain customer groupings, as discussed above.

As the customer conducts the transaction, the applications 60 are extracting information about the customer's performance as well as any information entered by the customer through the user interface 34. The customer may enter personal preference data with respect to the language, display format, etc. The customer's performance includes the number of mis-scans or mis-weighs, or the nature and number of instances in which the transaction was interrupted or intervention was required by store personnel. Most particularly, the applications collect information especially relevant to the customer's trust level. All of the information is passed to an update module 64 that automatically updates the personalization database 50. The database is preferably updated even if the customer has not registered within the store's system. Thus, the personalization database may maintain data on every customer that enters some form of identification into the terminal. Of course, some customers may only conduct cash transactions so that customer identification is not available. Moreover, some customers may not wish to have any personalized information maintained about them in a database. In that instance, the applications may give the customer the option of anonymity, in which case no personalized data will be maintained or passed to the update module 64. Of course, the customer choosing anonymity will also be choosing the default trust level assigned to all unknown users, along with the security measures associated with that default level.

The update module 64 may make other decisions beyond preserving the customer's anonymity. For instance, the update module may discriminate between events in a current transaction that warrant integration into the customer's personalized database and trust level determination. Some transactions may involve atypical items or the transaction may be plagued with problems with the hardware or software of the terminal 10. These transactions are not indicative of the customer's reliability in using the self-service terminal, so the update module may withhold the current transaction information from the personalization database 50. The update module 64 may also provide information about the current transaction to another module 66 that evaluates the impact upon collateral data about the store or customer shopping patterns. This information may be used to adjust the security settings based on the particular store or certain groups of shoppers. The collateral data module 66 may then communicate conclusion data to the update module 64 that updates the personalization database accordingly.

In the preferred embodiment, all of the processes conducted according to the architecture in FIG. 3 occur in real time and transparently to both the customer and the store management. Alternatively, the update module 64 may operate in a batch mode at the end of the business day to update the customer database where needed. As a further alternative, the module may permit intervention by the store management, whether locally or on a corporate level. The update module may flag transactions that result in a change in customer trust level and these flagged transactions may be reviewed and approved before the personalization database is updated.

The present invention contemplates assigning a trust level value to each customer using the self-service checkout terminals. This trust level may reflect a combination of the perceived honesty and/or reliability or competence of the customer based primarily on past performance using the checkout systems. In a first feature, the manner in which the transaction proceeds for the customer is based on the assigned trust level. In a second feature of the invention, the security measures taken during a transaction executed by the customer are a function of the trust level. In yet another feature, the trust level for each customer may be adjusted during a transaction, after each new transaction or after a series of transactions, based on the customer's performance during those transactions.

Since the present invention contemplates a wide range of factors contributing to a customer's trust level, several levels may be contemplated. In a specific embodiment, trust level values range from 1 to 5, with 5 being the highest level of reliability/honesty for a customer and 1 being the lowest. Finer or coarser gradations may be utilized depending upon the nature of the security response to each trust level. For instance, if the only security responses contemplated for a particular self-service system is whether or not a particular customer is permitted to use the system, only two trust levels are required. On the other hand, if the security response to adjust the product weight tolerance band, determine the number of mis-scans and mis-weighs, provide summary approval for the entire transaction, and adjust security activity based on product price, then finer gradations may be necessary.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A method for personalizing security conditions for a customer using a self-service checkout terminal to conduct a transaction on the terminal, comprising:
   assigning a trust level to the customer;
   maintaining the trust level value in a database accessible by the terminal;
   obtaining the trust level value from the database for the customer when that customer commences the transaction at the terminal;
   adjusting the manner in which the transaction occurs as a function of the customer's trust level as the transaction commences and during the transaction if the customer's trust level changes during the transaction;
   continuously evaluating the customer's exhibited reliability during the transaction; and
   updating the customer's trust level during the transaction using at least the evaluation of the customer's exhibited reliability to determine the trust level.

2. The method for personalizing security conditions of claim 1 in which the terminal includes a product weight scale on which the customer weighs items being purchased during the transaction, and in which the terminal evaluates the weight of each item relative to a mean weight for that item, wherein:
   the adjustment of the manner in which the transaction occurs includes assigning a weight tolerance band of acceptable weights about the mean weight as a function of the customer's trust level.

3. The method for personalizing security conditions of claim 2, in which the terminal maintains a database of mean weights and standard deviations for items being purchased during the transaction, and the weight tolerance band includes a 1σ band of one standard deviation about the mean, a 2σ band of two standard deviations about the mean, and a 3σ band of three standard deviations about the mean, wherein:
   the 1σ band is assigned to a customer with the worst trust level, and the 3σ band is assigned to a customer with best trust level.

4. The method for personalizing security conditions of claim 1 in which the terminal determines whether an error has occurred in the customer's use of the terminal during the transaction, wherein:
   the adjustment of the manner in which the transaction occurs includes adjusting the number of errors by the customer that will be tolerated before the transaction is interrupted.

5. The method for personalizing security conditions of claim 4 in which the terminal includes a product weight scale on which the customer weighs items being purchased during the transaction, and the error is an error in the customer's use of the product weight scale, wherein:

the adjustment of the manner in which the transaction occurs includes adjusting the number of weighing errors by the customer that will be tolerated before the transaction is interrupted.

6. The method for personalizing security conditions of claim 1 in which the terminal applies security measures to the transaction to determine whether the customer's conduct during the transaction is indicative of an attempted theft or other violation of the security of the transaction, wherein:

the security measures are selected as a function of the customer's trust level.

7. The method for personalizing security conditions of claim 1 further comprising:

obtaining information about the customer's conduct during the transaction;

using that information to determine an increase or decrease in the customer's trust level; and storing an updated trust level value for the customer in the database.

8. The method for personalizing security conditions of claim 7 wherein the customer's trust level is changed during the current transaction.

9. The method for personalizing security conditions of claim 7 wherein the customer's trust level is changed after the completion of a predetermined number of transactions.

10. The method for personalizing security conditions of claim 1 further comprising:

evaluating collateral factors independent to the customer that relate to the security of transactions on the terminal; and assigning a trust level to the customer based on these collateral factors.

11. The method for personalizing security conditions of claim 1 further comprising:

obtaining personal information from the customer that relate to the security of transactions on the terminal;

assigning a trust level to the customer based on this personal information.

12. The method for personalizing security conditions of claim 11 further comprising:

evaluating collateral factors independent to the customer that relate to the security of transactions on the terminal; and assigning a trust level to the customer based on these collateral factors and on the personal information.

13. The method for personalizing security conditions of claim 1 wherein updating the customer's trust level during the transaction using at least the evaluation of the customer's exhibited reliability to determine the trust level includes increasing the customer's trust level when the customer exhibits reliability at scanning and weighting products being purchased.

14. The method for personalizing security conditions of claim 1 wherein updating the customer's trust level during the transaction using at least the evaluation of the customer's exhibited reliability to determine the trust level includes decreasing the customer's trust level when the customer exhibits repeatedly mis-scans or mis-weights products being purchased.

* * * * *